(12) United States Patent
Hare

(10) Patent No.: US 6,945,549 B1
(45) Date of Patent: Sep. 20, 2005

(54) MOTORCYCLE CRASH BAR LIFT

(76) Inventor: Daniel John Hare, 158 E. Utica St., Oswego, NY (US) 13126

( * ) Notice: Subject to any disclaimer, the term of this patent is extended or adjusted under 35 U.S.C. 154(b) by 92 days.

(21) Appl. No.: 10/731,589

(22) Filed: Dec. 9, 2003

(51) Int. Cl.$^7$ .............................................. B62I 27/00
(52) U.S. Cl. .................. 280/293; 280/764.1; 280/755; 280/303
(58) Field of Search ............................... 280/293, 301, 280/303, 304.3, 755, 756, 764.1; D12/114, D12/115, 120

(56) References Cited

U.S. PATENT DOCUMENTS

| | | | |
|---|---|---|---|
| 1,941,801 A * | 1/1934 | Harley ..................... | 280/304.3 |
| 2,171,042 A * | 8/1939 | Minton ........................ | 180/219 |
| 3,602,528 A | 8/1971 | Kelly | |
| D244,519 S | 5/1977 | Larsen et al. | |
| 4,133,402 A | 1/1979 | Soo Hoo | |
| 4,136,890 A | 1/1979 | Vertucci | |
| 4,145,069 A * | 3/1979 | Kissick ........................ | 280/303 |
| 4,203,500 A * | 5/1980 | Kamiya ....................... | 180/219 |
| 4,358,127 A * | 11/1982 | Kissick ........................ | 280/303 |
| 4,377,295 A * | 3/1983 | Lemman ..................... | 280/303 |
| 4,494,764 A * | 1/1985 | Kelley ........................ | 280/293 |
| 4,826,194 A * | 5/1989 | Sakita ........................ | 280/302 |
| 5,118,126 A | 6/1992 | Yaple | |
| 5,358,265 A * | 10/1994 | Yaple ........................ | 280/293 |
| 5,401,055 A * | 3/1995 | Pham ........................ | 280/755 |
| 6,237,930 B1 * | 5/2001 | Code ........................ | 280/303 |

* cited by examiner

Primary Examiner—Lesley D. Morris
Assistant Examiner—Daniel Yeagley

(57) ABSTRACT

A motorcycle crash bar lift for lifting a motorcycle using a rotating crash bar having a bottom side, a top side, a left side and a right side. A mounting collar is connected to the crash bar bottom side. A mating gear is connected to the mounting collar and is rotatably connectable to a conventional motorcycle frame. A worm gear is in meshing contact with the mating gear, for driving the mating gear to rotate the mounting collar to rotate the crash bar to lift a conventional motorcycle. The worm gear is rotatably connectable to the conventional motorcycle frame.

18 Claims, 3 Drawing Sheets

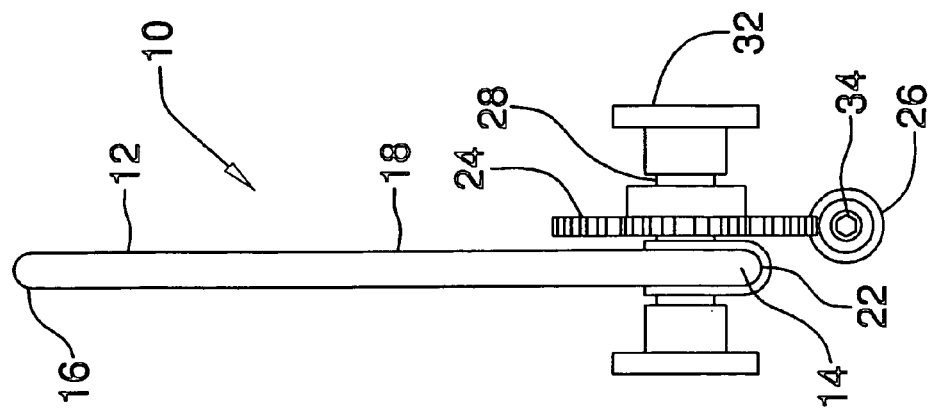
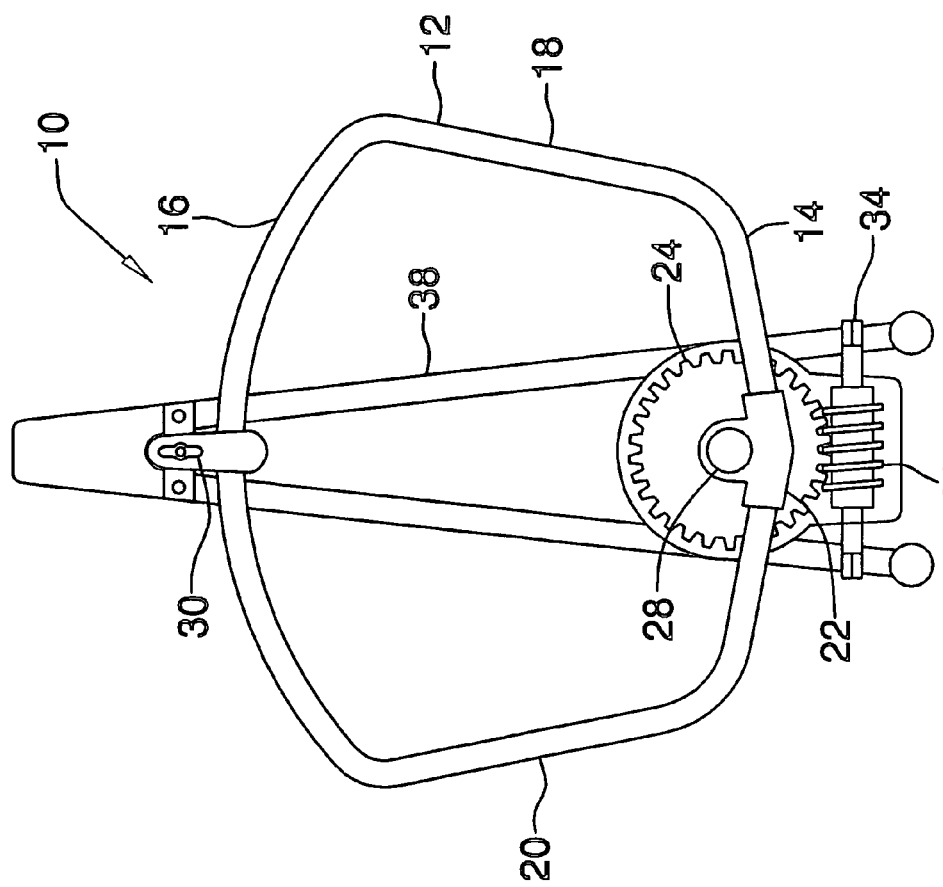

MOTORCYCLE CRASH BAR LIFT

BACKGROUND OF THE INVENTION

1. Field of the Invention

The present embodiment of the invention relates to a motorcycle crash bar lift for use in connection with motorcycle crash bars. The motorcycle crash bar lift has particular utility in connection with a gear driven pivotal crash bar capable of lifting a fallen motorcycle.

2. Description of the Prior Art

Motorcycle crash bar lifts are desirable for providing the functions of both a crash bar and in the event the motorcycle falls over can be used as a lift. A need was felt for a crash bar that had the added feature of being pivotal and gear driven for lifting a fallen motorcycle.

The use of motorcycle crash bars is known in the prior art. For example, U.S. Pat. No. 5,118,126 to Yaple discloses a powered motorcycle lift/stand assembly having a ground-contacting lower stand unit rotatable about an axis on an upper stand unit. Parking is accomplished by rotation of said lower stand into said ground-contacting position, followed by downward pivoting of said upper stand unit, thereby raising said rear end of said motorcycle. The stand is raised by reversing the sequence. Ground contacting area, stand width, and stability are increased while simultaneously retaining maximum road clearance. However, the Yaple '126 patent does not have a gear driven pivotal crash bar capable of lifting a fallen motorcycle.

Similarly, U.S. Pat. No. 4,136,890 to Vertucci discloses a combination leg shield and crash bar for motorcyles, allowing for stability and safety of riding, free movement of the legs, yet providing protection for the rider from wind, rain, mud, water, cold, insects. The leg shield is mounted in combination with the crash bar by means of clamps and is aesthetically pleasing. However, the Vertucci '890 patent does not have a gear driven pivotal crash bar capable of lifting a fallen motorcycle.

Further, U.S. Pat. No. 5,358,265 to Yaple discloses a motorcycle lift stand and actuator that comprises upper and lower stand units on each side of the motorcycle. This configuration enables independent raising of the motorcycle when resting on either side, as well as providing a normal parking function. Also disclosed is an improved linear actuator comprising a plurality of concentric telescoping members. Two embodiments of single groove ball return elements are disclosed. However, the Yaple '265 patent does not have a gear driven pivotal crash bar capable of lifting a fallen motorcycle.

Yet further, U.S. Pat. No. 4,133,402 to Soo Hoo discloses a two wheel motorized vehicle side wheel outrigger assembly for each side of a motorcycle, includes an arm pivotally connected to a mounting plate which in turn is attached rigidly to the frame of the vehicle. A strut is fixed to the arm and extends outwardly and rearwardly therefrom for supporting rotatably a wheel mounted at the outer end thereof. A piston cylinder assembly has a piston rod pivotally connected to the arm for latching releasably the arm to connect rigidly and releasably and the wheel in position for adding stability to the vehicle. A bypass conduit connects the interiors of the cylinder housing between the opposite sides of the piston head for enabling the piston head to move within the cylinder during normal operation of the vehicle to permit in turn the wheel to follow freely the contours of the ground and to absorb impacts encountered by the wheel. A valve is connected in fluid communication with the conduit for interrupting selectively the fluid communication between opposite sides of the cylinder assembly to prevent the wheel and its strut from moving relative to the mounting plate, thereby rendering the side wheel assembly to become rigid. The side wheel assemblies are adapted to fold upwardly and inwardly when not in use. However, the Soo Hoo '402 patent does not have a gear driven pivotal crash bar capable of lifting a fallen motorcycle.

Further still, U.S. Pat. No. Des. 244,519 to Larsen et al. discloses a motorcycle safety bar. However, the Larsen et al. '519 patent does not have a gear driven pivotal crash bar capable of lifting a fallen motorcycle.

Lastly, U.S. Pat. No. 3,602,528 to Kelly discloses a stabilizing device which prevents a motorcycle from tipping over. The device is mounted on the lower portion of a motorcycle and includes a member which pivots about an axis which is parallel to the longitudinal axis of the motorcycle. The lower portion of the pivotal member extends outwardly from beneath the motorcycle away from either side of the motorcycle. Stops in the stabilizing device prevent the pivotal member from rotating more than a certain number of degrees relative to the motorcycle. The stabilizing device includes an outrigger wheel assemblies attached to the lower outermost extremities of the pivotal member. Each of the outrigger wheel assemblies includes a platform which receives the motorcyclists feet and a caster mounted wheel which will pivot and follow the direction of motion of the motorcycle whenever the wheel contacts the ground surface. However, the Kelly '528 patent does not have a gear driven pivotal crash bar capable of lifting a fallen motorcycle.

While the above-described devices fulfill their respective, particular objectives and requirements, the aforementioned patents do not describe a motorcycle crash bar lift that allows a gear driven pivotal crash bar capable of lifting a fallen motorcycle. The Yaple '126, Vertucci '890, Yaple '265, Soo Hoo '402, Larsen et al. '519 and Kelly '528 patents make no provision a gear driven pivotal crash bar capable of lifting a fallen motorcycle.

Therefore, a need exists for a new and improved motorcycle crash bar lift which can be used for a gear driven pivotal crash bar capable of lifting a fallen motorcycle. In this regard, the present embodiment of the invention substantially fulfills this need.

In this respect, the motorcycle crash bar lift according to the present embodiment of the invention substantially departs from the conventional concepts and designs of the prior art, and in doing so provides an apparatus primarily developed for the purpose of a gear driven pivotal crash bar capable of lifting a fallen motorcycle.

SUMMARY OF THE INVENTION

In view of the foregoing disadvantages inherent in the known types of motorcycle crash bars now present in the prior art, the present embodiment of the invention provides an improved motorcycle crash bar lift, and overcomes the above-mentioned disadvantages and drawbacks of the prior art. As such, the general purpose of the present embodiment of the invention, which will be described subsequently in greater detail, is to provide a new and improved motorcycle crash bar lift and method which has all the advantages of the prior art mentioned heretofore and many novel features that result in a motorcycle crash bar lift which is not anticipated, rendered obvious, suggested, or even implied by the prior art, either alone or in any combination thereof.

To attain this, the present embodiment of the invention essentially comprises a rotating crash bar having a bottom side, a top side, a left side and a right side. A mounting collar is connected to the crash bar bottom side. A mating gear is connected to the mounting collar and is rotatably connectable to a conventional motorcycle frame. A worm gear is in meshing contact with the mating gear, for driving the mating gear to rotate the mounting collar to rotate the crash bar to lift a conventional motorcycle. The worm gear is rotatably connectable to the conventional motorcycle frame.

There has thus been outlined, rather broadly, the more important features of the embodiment of the invention in order that the detailed description thereof that follows may be better understood and in order that the present contribution to the art may be better appreciated.

The present embodiment of the invention may also include a drive axle, a key lock restraint, a bearing, a hex drive and a drive motor. There are, of course, additional features of the present embodiment of the invention that will be described hereinafter and which will form the subject matter of the claims attached.

Numerous objects, features and advantages of the present embodiment of the invention will be readily apparent to those of ordinary skill in the art upon a reading of the following detailed description of presently preferred, but nonetheless illustrative, embodiments of the present embodiment of the invention when taken in conjunction with the accompanying drawings. In this respect, before explaining the current embodiment of the embodiment of the invention in detail, it is to be understood that the embodiment of the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present embodiment of the invention.

It is therefore an object of the present embodiment of the invention to provide a new and improved motorcycle crash bar lift that has all of the advantages of the prior art motorcycle crash bars and none of the disadvantages.

It is another object of the present embodiment of the invention to provide a new and improved motorcycle crash bar lift that may be easily and efficiently manufactured and marketed.

An even further object of the present embodiment of the invention is to provide a new and improved motorcycle crash bar lift that has a low cost of manufacture with regard to both materials and labor, and which accordingly is then susceptible of low prices of sale to the consuming public, thereby making such motorcycle crash bar lift economically available to the buying public.

Still another object of the present embodiment of the invention is to provide a new motorcycle crash bar lift that provides in the apparatuses and methods of the prior art some of the advantages thereof, while simultaneously overcoming some of the disadvantages normally associated therewith.

Lastly, it is an object of the present embodiment of the invention is to provide a motorcycle crash bar lift for a gear driven pivotal crash bar capable of lifting a fallen motorcycle.

These together with other objects of the embodiment of the invention, along with the various features of novelty that characterize the embodiment of the invention, are pointed out with particularity in the claims annexed to and forming a part of this disclosure. For a better understanding of the embodiment of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The embodiment of the invention will be better understood and objects other than those set forth above will become apparent when consideration is given to the following detailed description thereof. Such description makes reference to the annexed drawings wherein:

FIG. 2 is a left side view of the motorcycle crash bar lift of the present embodiment of the invention.

FIG. 3 is a front side view of the motorcycle crash bar lift of the present embodiment of the invention.

The same reference numerals refer to the same parts throughout the various figures.

DESCRIPTION OF THE PREFERRED EMBODIMENT

Figure 1:
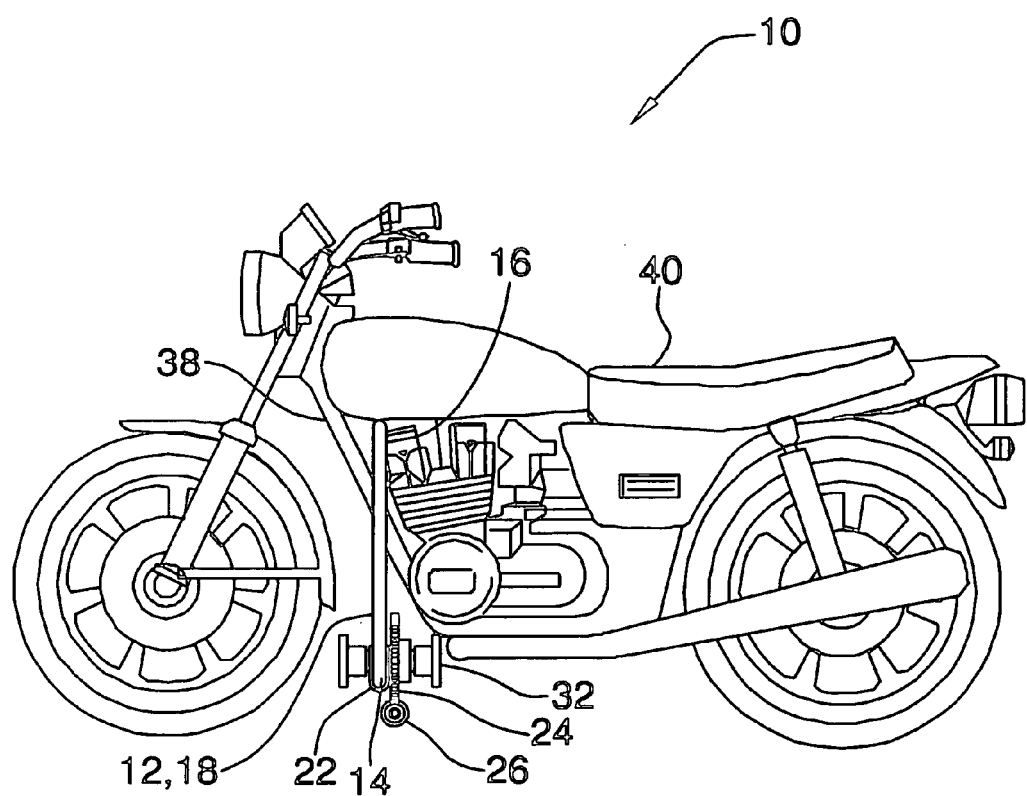
FIG. 1 is a left side view of the preferred embodiment of the motorcycle crash bar lift constructed in accordance with the principles of the present invention.

Referring now to the drawings, and particularly to FIGS. 1–5, a preferred embodiment of the motorcycle crash bar lift of the present invention is shown and generally designated by the reference numeral 10.

In FIG. 1, a new and improved motorcycle crash bar lift 10 of the present invention for a gear driven pivotal crash bar capable of lifting a fallen motorcycle is illustrated and will be described. More particularly, the motorcycle crash bar lift 10 has a crash bar 12 having a bottom side 14, a top side 16, a left side 18 and a right side 20 (shown in FIG. 2). A mounting collar 22 is connected to the crash bar bottom side 14. A mating gear 24 is connected to the mounting collar 22. The mating gear 24 is rotatably connectable to a conventional motorcycle frame 38. A worm gear 26 is in meshing contact with the mating gear 24. The worm gear 26 is for driving the mating gear 24 to rotate the mounting collar 22 to rotate the crash bar 12 to lift a conventional motorcycle 40. The worm gear 26 is rotatably connectable to the conventional motorcycle frame 38. A bearing 32 is connected to the mating gear 24.

In FIG. 2, the motorcycle crash bar lift 10 is illustrated and will be described. More particularly, the motorcycle crash bar lift 10 has the crash bar 12 having the bottom side 14, the top side 16, the left side 18 and the right side 20. The crash bar 12 is comprised of tubular steel that is 1¼ inch in diameter. The crash bar is approximately 18 inches tall and 35 inches wide. The crash bar 12 is arched across the top side 16. The crash bar 12 is angled downwardly and inwardly on the left side 18. The crash bar 12 is angled downwardly and inwardly on the right side 20. The crash bar bottom side 14 is angled at the obtuse angle to meet the crash bar left side 18. The crash bar bottom side 14 is angled at the obtuse angle to meet the crash bar right side 20. The mounting collar 22 is connected to the crash bar bottom side 14. The mating gear 24 is connected to the mounting collar 22. The mating gear 24 is rotatably connectable to the conventional motorcycle frame 38. The worm gear 26 is in meshing contact with the mating gear 24. The worm gear 26 is for driving the mating gear 24 to rotate the mounting collar 22 to rotate the crash bar 12 to lift the conventional motorcycle 40 (shown in FIG. 1). The worm gear 26 is rotatably connectable to the conventional motorcycle frame 38. A drive axle 28 is connected to the mounting collar 22. The drive axle 28 is connected to the mating gear 24. A key lock restraint 30 is connectable to the conventional motorcycle frame 38. The key lock restraint 30 is detachably connectable to the crash bar top side 16 for locking the crash bar 12 in the fixed position. A hex drive 34 is connected to the worm gear 26 for rotating the worm gear 26.

In FIG. 3, the motorcycle crash bar lift 10 is illustrated and will be described. More particularly, the motorcycle crash bar lift 10 has the crash bar 12 having the bottom side 14, the top side 16, the left side 18 and the right side 20 (shown in FIG. 2). The mounting collar 22 is connected to the crash bar bottom side 14. The mating gear 24 is connected to the mounting collar 22. The mating gear 24 is rotatably connectable to the conventional motorcycle frame 38 (shown in FIG. 1). The worm gear 26 is in meshing contact with the mating gear 24. The worm gear 26 is for driving the mating gear 24 to rotate the mounting collar 22 to rotate the crash bar 12 to lift the conventional motorcycle 40 (shown in FIG. 1). The worm gear 26 is rotatably connectable to the conventional motorcycle frame 38. The drive axle 28 is connected to the mounting collar 22. The drive axle 28 is connected to the mating gear 24. The bearing 32 is connected to the mating gear 24. The hex drive 34 is connected to the worm gear 26 for rotating the worm gear 26.

Figure 4:
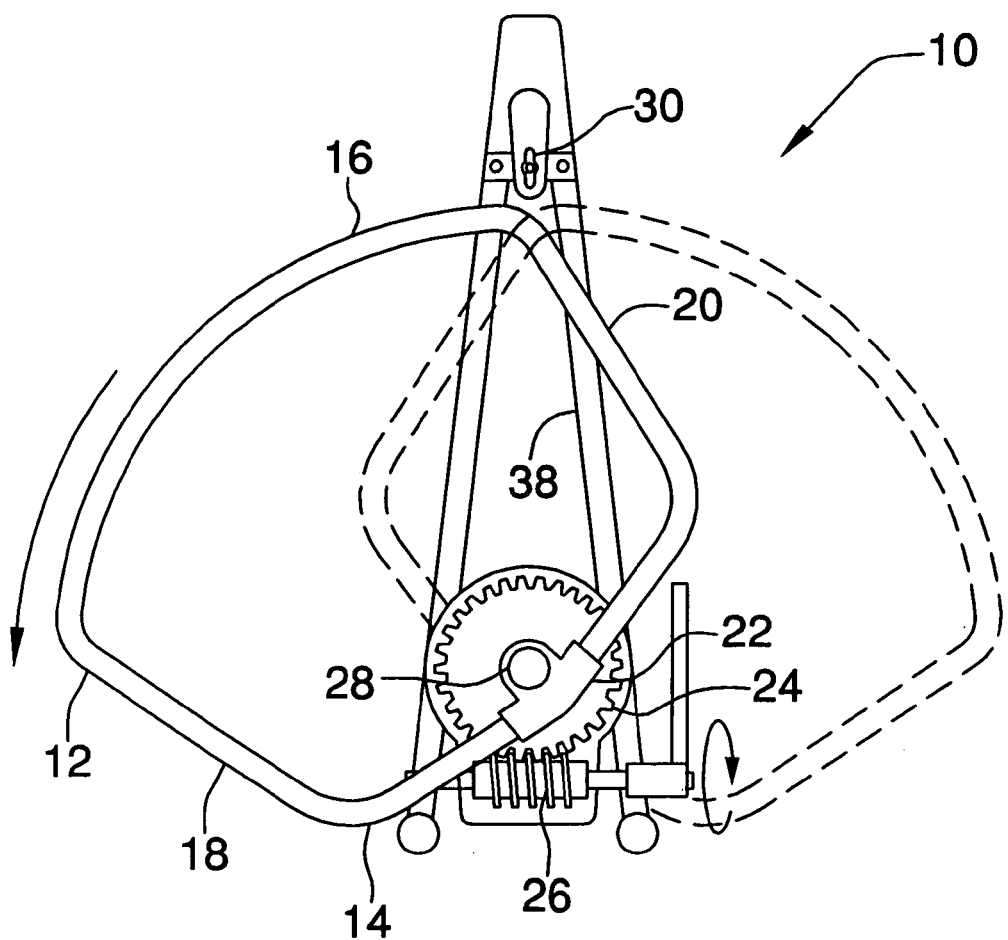
FIG. 4 is a front side view of the motorcycle crash bar lift of the present embodiment of the invention.

In FIG. 4, the motorcycle crash bar lift 10 is illustrated and will be described. More particularly, the motorcycle crash bar lift 10 has the crash bar 12 having the bottom side 14, the top side 16, the left side 18 and the right side 20. The crash bar 12 is comprised of tubular steel that is 1¼ inch in diameter. The crash bar is approximately 18 inches tall and 35 inches wide. The crash bar 12 is arched across the top side 16. The crash bar 12 is angled downwardly and inwardly on the left side 18. The crash bar 12 is angled downwardly and inwardly on the right side 20. The crash bar bottom side 14 is angled at the obtuse angle to meet the crash bar left side 18. The crash bar bottom side 14 is angled at the obtuse angle to meet the crash bar right side 20.

The mounting collar 22 is connected to the crash bar bottom side 14. The mating gear 24 is connected to the mounting collar 22. The mating gear 24 is rotatably connectable to the conventional motorcycle frame 38. The worm gear 26 is in meshing contact with the mating gear 24. The worm gear 26 is for driving the mating gear 24 to rotate the mounting collar 22 to rotate the crash bar 12 to lift the conventional motorcycle 40 (shown in FIG. 1). The worm gear 26 is rotatably connectable to the conventional motorcycle frame 38. The drive axle 28 is connected to the mounting collar 22. The drive axle 28 is connected to the mating gear 24. The key lock restraint 30 is connectable to the conventional motorcycle frame 38. The key lock restraint 30 is detachably connectable to the crash bar top side 16 for locking the crash bar 12 in the fixed position.

Figure 5:
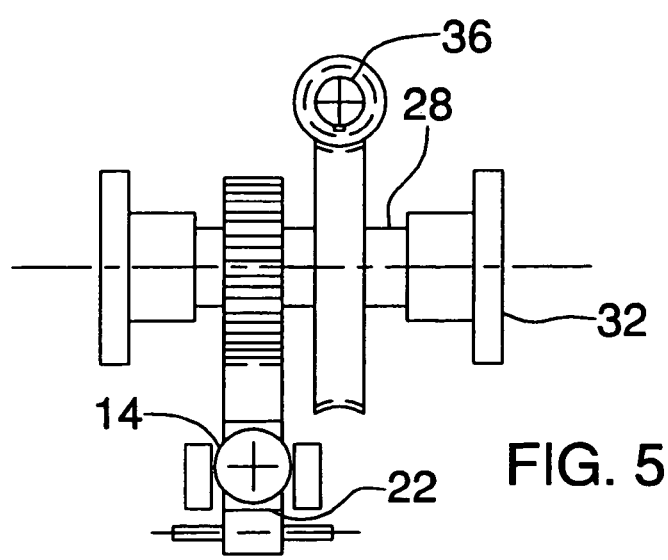
FIG. 5 is a left side view of the motorcycle crash bar lift of the present embodiment of the invention.

In FIG. 5, the motorcycle crash bar lift 10 is illustrated and will be described. More particularly, the motorcycle crash bar lift 10 has the crash bar 12 having the bottom side 14. The mounting collar 22 is connected to the crash bar bottom side 14. The mating gear 24 is connected to the mounting collar 22. The mating gear 24 is rotatably connectable to the conventional motorcycle frame 38 (shown in FIG. 1). The worm gear 26 is in meshing contact with the mating gear 24. The worm gear 26 is for driving the mating gear 24 to rotate the mounting collar 22 to rotate the crash bar 12 to lift the conventional motorcycle 40 (shown in FIG. 1). The worm gear 26 is rotatably connectable to the conventional motorcycle frame 38 (shown in FIG. 1). The drive axle 28 is connected to the mounting collar 22. The drive axle 28 is connected to the mating gear 24. The bearing 32 is connected to the mating gear 24. In this alternate embodiment a drive motor 36 is drivingly connected to the worm gear 26.

In use it can now be seen that when the conventional motorcycle has toppled over, the owner would first unlock the key lock restraint 30. Using a mechanical drive mechanism such as a conventional socket wrench applied to the hex drive 34, the owner would apply torque in the appropriate direction. The worm gear 26 would rotate the crash bar 12 to the opposite side and enable the motorcycle to self-right through leverage action.

While a preferred embodiment of the motorcycle crash bar lift has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present embodiment of the invention. For example, any suitable sturdy material such as composite may be used instead of the steel crash bar described. And although a gear driven pivotal crash bar capable of lifting a fallen motorcycle have been described, it should be appreciated that the motorcycle crash bar lift herein described is also suitable for lifting an all terrain vehicle.

Therefore, the foregoing is considered as illustrative only of the principles of the embodiment of the invention. Further, since numerous modifications and changes will readily occur to those skilled in the art, it is not desired to limit the embodiment of the invention to the exact construction and operation shown and described, and accordingly, all suitable modifications and equivalents may be resorted to, falling within the scope of the embodiment of the invention.

I claim:

1. A motorcycle crash bar lift comprising:
    a crash bar, said crash bar having a bottom side, said crash bar having a top side, said crash bar having a left side, said crash bar having a right side;
    a mounting collar connected to said crash bar bottom side;
    a mating gear connected to said mounting collar, said mating gear rotatably connectable to a conventional motorcycle frame; and
    a worm gear in meshing contact with said mating gear, said worm gear for driving said mating gear to rotate said mounting collar to rotate said crash bar to lift a conventional motorcycle, said worm gear rotatably connectable to said conventional motorcycle frame.

2. The motorcycle crash bar lift of claim 1 further comprising:
a drive axle connected to said mounting collar, said drive axle connected to said mating gear.

3. The motorcycle crash bar lift of claim 1 further comprising:
a key lock restraint connectable to said conventional motorcycle frame, said key lock restraint detachably connectable to said crash bar top side, for locking said crash bar in a fixed position.

4. The motorcycle crash bar lift of claim 1 further comprising:
a bearing connected to said mating gear.

5. The motorcycle crash bar lift of claim 1 wherein:
said crash bar is comprised of tubular steel that is 1¼ inch in diameter.

6. The motorcycle crash bar lift of claim 1 wherein:
said crash bar is approximately 18 inches tall and 35 inches wide.

7. The motorcycle crash bar lift of claim 1 wherein:
said crash bar is arched across said top side, said crash bar is angled downwardly and inwardly on said left side, said crash bar is angled downwardly and inwardly on said right side, said crash bar bottom side is angled at an obtuse angle to meet said crash bar left side, said crash bar bottom side is angled at an obtuse angle to meet said crash bar right side.

8. The motorcycle crash bar lift of claim 1 further comprising:
a hex drive connected to said worm gear for rotating said worm gear.

9. The motorcycle crash bar lift of claim 1 further comprising:
a drive motor drivingly connected to said worm gear.

10. A motorcycle crash bar lift comprising:
a crash bar, said crash bar having a bottom side, said crash bar having a top side, said crash bar having a left side, said crash bar having a right side;
a mounting collar connected to said crash bar bottom side;
a mating gear connected to said mounting collar, said mating gear rotatably connectable to a conventional motorcycle frame;
a worm gear in meshing contact with said mating gear, said worm gear for driving said mating gear to rotate said mounting collar to rotate said crash bar to lift a conventional motorcycle, said worm gear rotatably connectable to said conventional motorcycle frame; and
a drive axle connected to said mounting collar, said drive axle connected to said mating gear.

11. The motorcycle crash bar lift of claim 10 further comprising:
a key lock restraint connectable to said conventional motorcycle frame, said key lock restraint detachably connectable to said crash bar top side, for locking said crash bar in a fixed position.

12. The motorcycle crash bar lift of claim 11 further comprising:
a bearing connected to said mating gear.

13. The motorcycle crash bar lift of claim 12 wherein:
said crash bar is comprised of tubular steel that is 1¼ inch in diameter.

14. The motorcycle crash bar lift of claim 13 wherein:
said crash bar is approximately 18 inches tall and 35 inches wide.

15. The motorcycle crash bar lift of claim 14 wherein:
said crash bar is arched across said top side, said crash bar is angled downwardly and inwardly on said left side, said crash bar is angled downwardly and inwardly on said right side, said crash bar bottom side is angled at an obtuse angle to meet said crash bar left side, said crash bar bottom side is angled at an obtuse angle to meet said crash bar right side.

16. The motorcycle crash bar lift of claim 15 further comprising:
a hex drive connected to said worm gear for rotating said worm gear.

17. The motorcycle crash bar lift of claim 15 further comprising:
a drive motor drivingly connected to said worm gear.

18. A motorcycle crash bar lift comprising:
a crash bar, said crash bar having a bottom side, said crash bar having a top side, said crash bar having a left side, said crash bar having a right side, said crash bar is comprised of tubular steel that is 1¼ inch in diameter, said crash bar is approximately 18 inches tall and 35 inches wide, said crash bar is arched across said top side, said crash bar is angled downwardly and inwardly on said left side, said crash bar is angled downwardly and inwardly on said right side, said crash bar bottom side is angled at an obtuse angle to meet said crash bar left side, said crash bar bottom side is angled at an obtuse angle to meet said crash bar right side;
a mounting collar connected to said crash bar bottom side;
a mating gear connected to said mounting collar, said mating gear rotatably connectable to a conventional motorcycle frame;
a worm gear in meshing contact with said mating gear, said worm gear for driving said mating gear to rotate said mounting collar to rotate said crash bar to lift a conventional motorcycle, said worm gear rotatably connectable to said conventional motorcycle frame;
a drive axle connected to said mounting collar, said drive axle connected to said mating gear;
a key lock restraint connectable to said conventional motorcycle frame, said key lock restraint detachably connectable to said crash bar top side, for locking said crash bar in a fixed position;
a bearing connected to said mating gear; and
a hex drive connected to said worm gear for rotating said worm gear.

\* \* \* \* \*